(12) United States Patent
Wellman et al.

(10) Patent No.: US 6,315,004 B1
(45) Date of Patent: Nov. 13, 2001

(54) ELECTROSTATIC CHARGE NEUTRALIZING FUME DUCT

(75) Inventors: Raymond L. Wellman, El Cerito, CA (US); Michael S. Cork, Richardson, TX (US)

(73) Assignee: ATS Products, Inc., Richmond, CA (US)

( * ) Notice: Subject to any disclaimer, the term of this patent is extended or adjusted under 35 U.S.C. 154(b) by 0 days.

(21) Appl. No.: 09/603,468

(22) Filed: Jun. 26, 2000

(51) Int. Cl.[7] ........................................ F16L 9/14
(52) U.S. Cl. .................. 138/146; 138/153; 138/129; 138/DIG. 2; 138/DIG. 7; 138/174; 428/36.4; 428/377
(58) Field of Search ..................... 138/129, 146, 138/153, 140, DIG. 2, DIG. 7, 137, 174, 177, 149, 154; 428/36.4, 34.5, 34.6, 377

(56) References Cited

U.S. PATENT DOCUMENTS

| | | | |
|---|---|---|---|
| 3,718,161 | * 2/1973 | Woodson | 138/153 |
| 4,120,325 | 10/1978 | de Putter | 138/145 |
| 4,635,162 | 1/1987 | McLaughlin | 361/215 |
| 5,017,312 | * 5/1991 | Peters et al. | 264/24 |
| 5,298,299 | 3/1994 | Shea | 428/34.5 |
| 5,383,994 | 1/1995 | Shea | 156/175 |

OTHER PUBLICATIONS

The Dow Chemical Company, Dow Plastics, Technical Information Bulletin Dated 6/98 entitled Electrical Grounding Of FRP Equipment.

The Dow Chemical Company, Dow Plastics, Technical Information Bulletin Dated Dec. 1, 1992 entitledConductive LiningSystem For FRP Equipment.

* cited by examiner

Primary Examiner—Patrick Brinson
(74) Attorney, Agent, or Firm—Donald Diamond

(57) ABSTRACT

A laminated inner wall of a dual wall fume duct for transporting corrosive vapors and gases, and a process for fabricating the wall. The innermost layer of the wall is made of a cured epoxy vinyl ester resin incorporating chopped carbonized carbon fibers. The electrically conductive fibers act to dissipate and neutralize electrostatic charges generated by triboelectric processes.

9 Claims, 3 Drawing Sheets

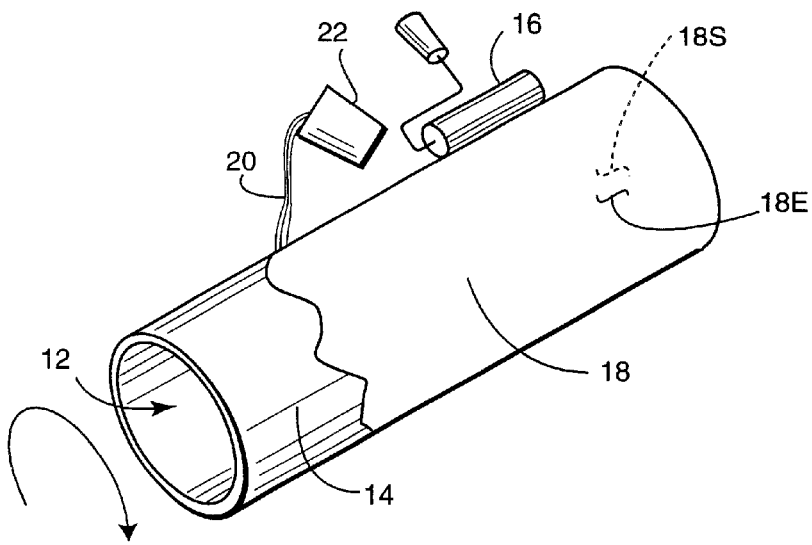
FIG. 1
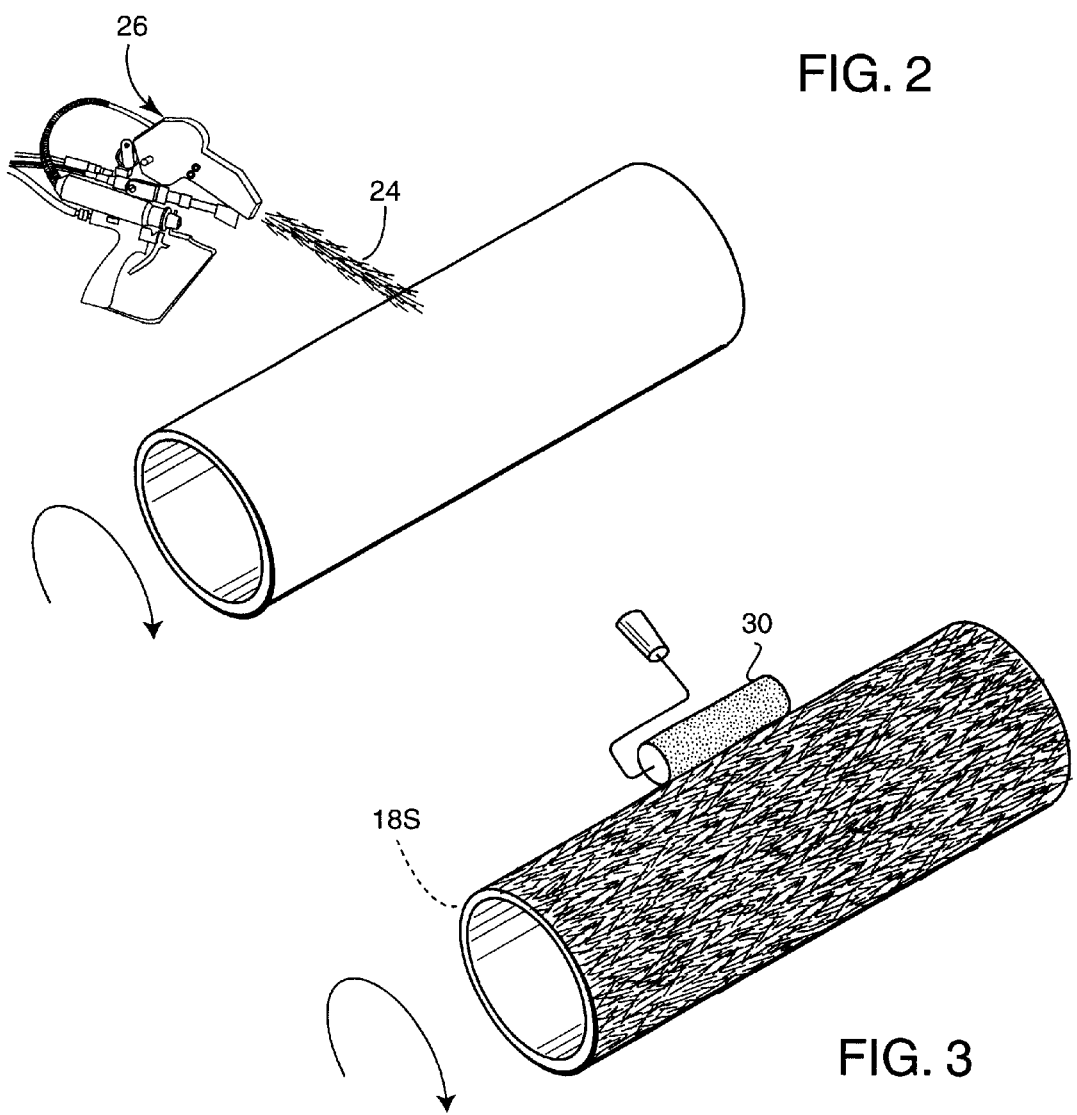
FIG. 2
FIG. 3

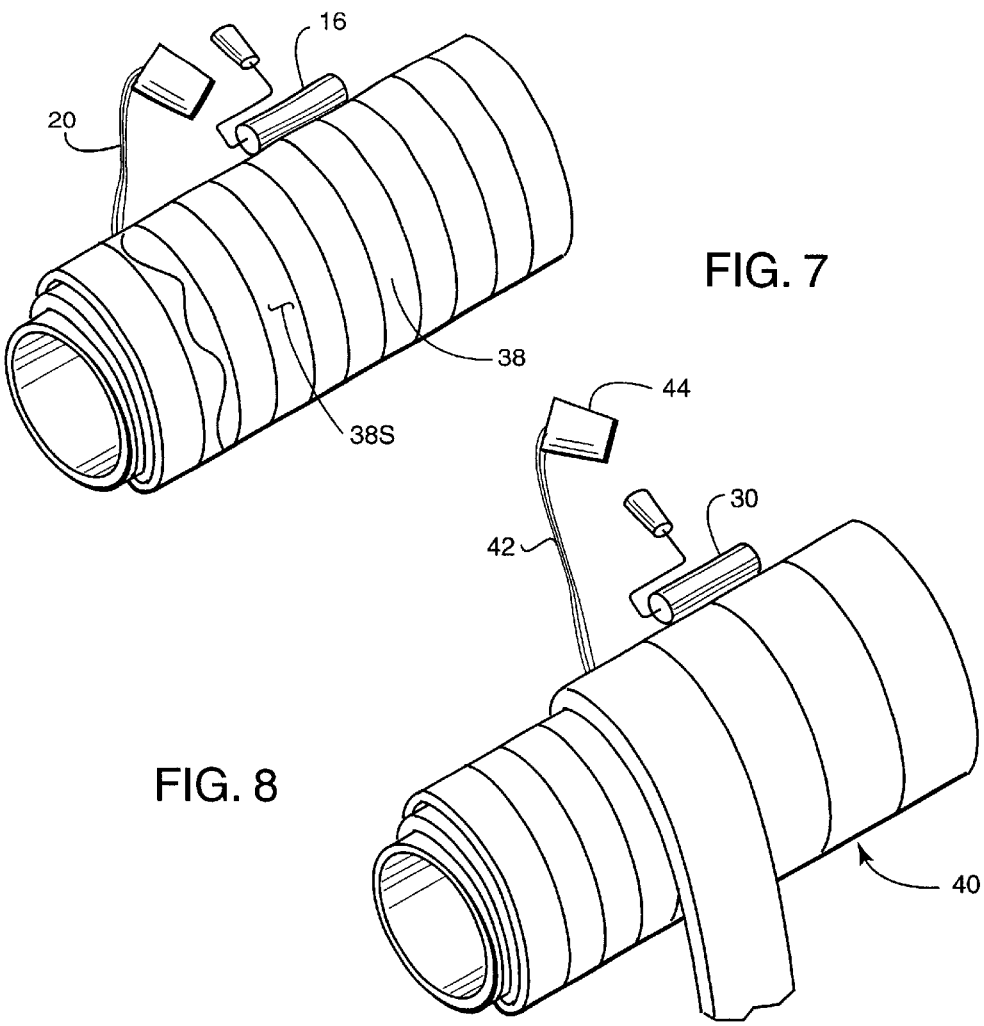
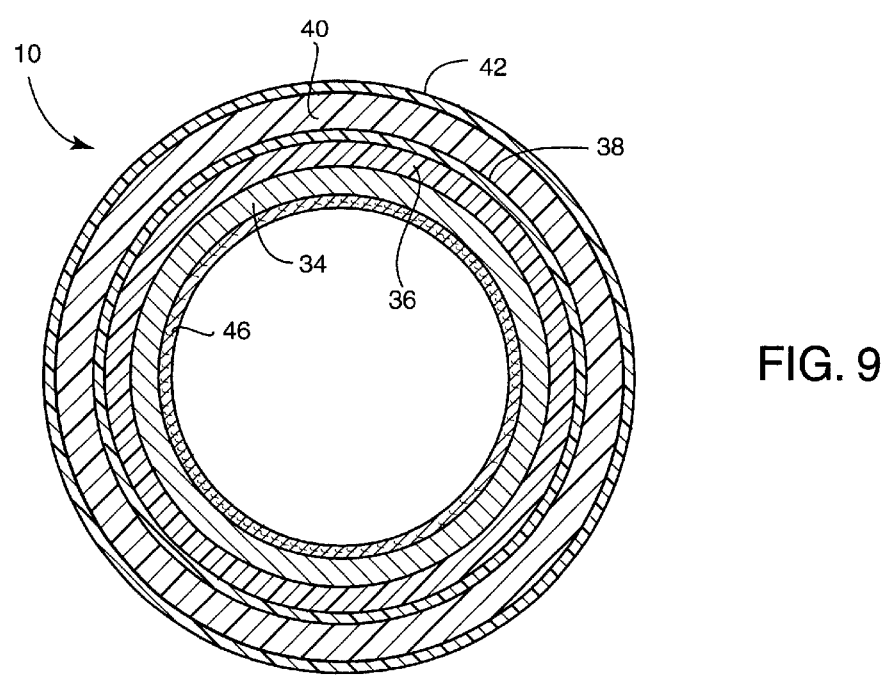

ELECTROSTATIC CHARGE NEUTRALIZING FUME DUCT

BACKGROUND OF THE INVENTION

1. Field of the Invention

The present invention relates to fume exhaust ducts and more particularly to a dual wall duct having a laminated inner wall whose innermost layer incorporates carbon fibers which dissipate and neutralize built-up electrostatic charges resulting from vapors or gases flowing within the duct.

2. Description of the Related Art

Ductwork for corrosive or otherwise dangerous vapor and gas exhaust systems is used extensively in many diverse industries which utilize hazardous chemicals to process raw materials or perform manufacturing procedures, such as the semiconductor industry, the plating industry, and the pharmaceutical industry. Such ductwork also is required in the many research and development laboratories which use highly reactive, toxic or otherwise hazardous chemicals in conducting experiments. Consequently, vapors from such chemicals must be exhausted through leak-proof air ducts to safely remove them from work areas. Installations can be very large, consisting of many thousands of feet of ductwork which may be manifolded and connected to multiple exhaust fans. Because of the wide diversity of chemicals used in industrial and research applications, it is extremely difficult to provide a single material for fabricating ductwork which can withstand all the chemicals to which duct interiors may be exposed. Materials which have been used heretofore to fabricate fume exhaust ductwork include black steel, galvanized steel and stainless steel, as well as plastic materials such as polyvinylchloride, polypropylene, coated materials, and fiberglass reinforced plastics (FRP's). Over the past forty years the trend in materials has been away from metals and coated metals and toward the use of plastics, particularly FRP's.

Various types of resins have been used in manufacturing FRP's. Some are resistant to certain families of chemicals, but no single resin can resist all the vapors used in industries such as semiconductor manufacturing and electroplating. Another problem is providing adequate resistance to fire. Unlike metallic ducts, plastic ducts exhausting chemicals which can react exothermically with themselves or with duct surfaces are at risk to combustion. Plastics typically burn rapidly and generate much smoke, creating hazards of their own. A third problem in using plastic is the possibility of static electrical charge building up on a duct's interior surface. Electrostatic charge is usually generated by frictional processes during contact and separation of materials. So-called "triboelectric charging" can occur even when dry media such as air or air laden with dust particles flow through ungrounded plastic pipes. Because plastic is an insulator, a considerable amount of charge can be generated on a duct's inner surface. An insulative material does not readily allow the flow of electrons, so both positive and negative charges can reside on the surface at the same time, although at different sites.

If the voltage at a site builds up sufficiently, an electrostatic discharge will occur creating an arc which, depending on the characteristics of the ambient vapor, can trigger an explosion or fire. Perhaps the worst cases when exhausting hazardous vapors are those containing halogens such as fluorine or chlorine and those containing metallic vapors such as cesium or potassium. Such vapors are easily ionized as well as highly corrosive and/or toxic.

U.S. Pat. Nos. 5,298,299 ("'299") and 5,383,994 ("'994") to L. E. Shea, which are incorporated in their entirety herein by reference, are directed to, respectively, a composite fume exhaust duct having both good chemical resistance and good fire resistance properties, and a method for making the dual-laminate duct. Ducts made in accordance with the invention described in these patents are generally tubular with a diametral size in the range of 2 inches to 84 inches, and have an inner laminate portion of chemically resistant material covered by and integral with an outer laminate portion of fire retardant material. The inner laminate is comprised of material such as fiberglass which is saturated with a chemically resistant resin such as a halogenated vinyl ester. The outer laminate which covers the inner laminate is similarly comprised of fabric or fiberglass material which is combined with a resorcinol or phenol/resorcinol type fire-retardant resin. The duct is formed by first coating a mylar wrapped mandrel with the chemically resistant resin and then wrapping the mandrel with successive layers of fabric material saturated with the resin. The outer fire-retardant laminate is then formed directly over the inner laminate by applying successive layers of a suitable fabric material saturated with the fire-retardant resin. The composite structure is then allowed to cure and harden before being removed from the mandrel. Such ducts do not, however, eliminate or even mitigate the hazard of static charge build-up on the innermost surface of the inner laminate, which typically has a resistivity of the order of $10^{14}$–$10^{15}$ ohms-cm.

Techniques for dissipating electrostatic charges in plastic pipe systems without the need to ground each pipe section individually are described in the related art. U.S. Pat. No. 4,120,325 to W. J. de Putter discloses a polyvinylchloride pipe having an outer and/or an inner surface coated with a layer of thermosetting epoxy material containing carbon particles so that the layer is electrically conductive. An elastomeric seal connecting two sections of pipe also contains carbon particles so multi-section piping need only have a single ground. U.S. Pat. No. 4,635,162 to H. T. McLaughlin discloses an electrically conductive flange for joining a conduit and fitting to each other while providing electrical connectivity from the conduit and fitting to bolts used to secure their mating flanges. The flange body and an annular rim are non-conductive and at least one strand of conductive yarn is incorporated within a bore which receives the conduit end. Each strand is in conductive contact with the inside surface of the conduit and extends to the rim to contact a bolt. The flange provides for a continuous conductive pathway along a piping system, so grounding can take place at a single location.

Neither device provides a solution to eliminating the possibility of electrostatic discharge occurring when exhausting chemically reactive fumes. The duct inner surface must be able to withstand corrosion and other chemical reaction with the fumes while also neutralizing triboelectric charges. Ideally, there would be no need to electrically ground individual duct sections or even an entire ductwork assembly if its duct sections were electrically connected.

OBJECTS OF THE INVENTION

In view of the limitations of the related art, it is a primary object of the present invention to provide a fume exhaust duct having an innermost portion which withstands hazardous fumes while dissipating and neutralizing electrostatic charge build-up.

Another object of the invention is to provide an inner wall for a dual-laminate duct which does not require electrical grounding.

Yet another object of the invention is to provide a process for making the duct inner wall.

Other objects of the invention will become evident when the following description is considered with the accompanying drawing figures. In the figures and description, numerals indicate the various features of the invention, like numerals referring to like features throughout both the drawings and description.

SUMMARY OF THE INVENTION

These and other objects are achieved by the present invention which in a first aspect provides a laminated duct structure for transporting corrosive vapors and gases which includes an innermost layer of a cured epoxy vinyl ester resin incorporating electrically conductive fibers distributed three-dimensionally throughout the layer and two-dimensionally at the surface exposed to the fumes.

In another aspect the invention provides a laminated inner wall of a dual wall duct structure for transporting corrosive vapors and gases which includes an innermost layer of epoxy vinyl ester resin admixed with a curing agent and incorporating electrically conductive fibers distributed three-dimensionally throughout the layer and two-dimensionally at the surface exposed to the fumes. The inner wall further includes two layers of polyester veil wound over the innermost layer, with the outer veil layer pre-wetted with the admixture. The inner wall further includes a layer of the admixture applied over the outer veil layer, and a layer of mat-type fiberglass pre-wetted with a phenolic resin admixed with a curing agent and wound over the admixture layer.

In still another aspect the invention provides a process for fabricating a laminated inner wall of a dual wall duct structure for transporting corrosive vapors and gases. The process includes the steps of: forming as a supply source a fluidic admixture of an epoxy vinyl ester resin and a curing agent; evenly coating a mylar-covered mandrel with a layer of the admixture; evenly applying to the exterior surface of the layer a preselected percentage-by-weight, relative to the weight of the layer, of chopped carbon fibers; breaking down any clumps of fibers and blending the fibers and layer to a uniform color and texture; evenly coating the fiber-incorporated layer with a second layer of the admixture; evenly applying fibers to the exterior surface of the second layer in the same percentage-by-weight, relative to the weight of the layer; breaking down any clumps of fibers in the second layer and blending the fibers and layer to a uniform color and texture, so that the first and second layers blend into a single, blended layer; tightly winding a layer of polyester veil over the exterior surface of the blended layer; tightly winding a second layer of polyester veil pre-wetted with the admixture over the first layer of veil and rolling out trapped air; evenly applying over the second layer of veil a layer of the admixture; tightly winding a layer of mat-type fiberglass, pre-wetted with a phenolic resin admixed with a curing agent, over the layer of admixture; and allowing the resins to cure and set to a hard state.

A more complete understanding of the present invention and other objects, aspects and advantages thereof will be gained from a consideration of the following description of the preferred embodiment read in conjunction with the accompanying drawings provided herein.

BRIEF DESCRIPTION OF THE DRAWINGS

FIG. 1 schematically shows a first step in making an electrically conductive laminated inner wall of a dual-wall fume exhaust duct, wherein a thin coating of an admixture of epoxy vinyl ester resin and curing agent is rolled onto a rotating mylar-covered mandrel.

FIG. 2 schematically shows second and fourth steps in making the inner wall wherein 0.25-inch carbon fibers are applied to the FIG. 1 or FIG. 3 mandrel.

FIG. 3 schematically shows third and fifth steps in making the inner wall wherein a roller evenly distributes the fibers and rolls out air trapped in the FIG. 2 or FIG. 4 coating.

FIG. 7 schematically shows a ninth step in making the inner wall wherein a third thin coating of the FIG. 1 admixture is applied to the FIG. 6 mandrel.

FIG. 8 schematically shows a tenth step in making the inner wall wherein 0.75 oz./yd$^2$ fiberglass mat, pre-wetted with an admixture of phenolic resin and curing agent, is wound over the FIG. 7 mandrel, followed by trapped air being rolled out with the FIG. 3 roller.

FIG. 9 is a schematic cross-sectional view of the inner wall laminate made according to steps 1 through 10.

DESCRIPTION OF THE PREFERRED EMBODIMENTS

I. Introduction

Figure 4:
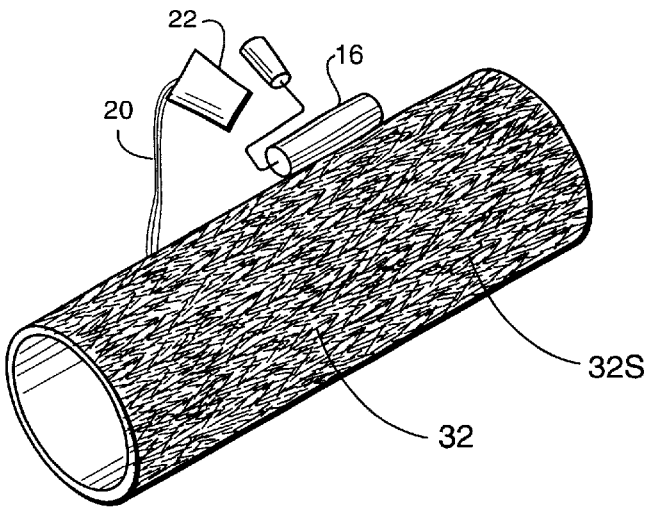
FIG. 4 schematically shows a sixth step in making the inner wall wherein a second thin coating of the FIG. 1 admixture is rolled onto the FIG. 3 mandrel.

While the present invention is open to various modifications and alternative constructions, the preferred embodiment shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims.

II. Inner Wall Laminate Assembly

FIGS. 1–8 show sequential steps in fabricating a fume exhaust duct laminated inner wall 10 as shown in FIG. 9. Referring to FIG. 1, in a first step a slowly rotating, generally circular mandrel 12 covered with mylar sheeting 14 is evenly coated using a roller applicator 16 with a thin layer 18 of an admixture 20 of epoxy vinyl ester resin and benzoyl peroxide having an interior surface 18S contiguous to the sheeting 14 and an exterior surface 18E. Layer 18 typically is 2–3 mils in thickness and is dispensed from a suitable dispensing device 22. The benzoyl peroxide, which is 1 to 5 percent-by-weight relative to the weight of the resin, cures the liquid resin to a solid at ambient temperature. About 0.3 pound of resin per square foot of mandrel surface area is used. The chemically inert mylar acts as a "bond-breaker" allowing the assembled duct to be easily removed from the mandrel. Preferably, the resin is type 510A–40 DERAKANE™ manufactured by the Dow Chemical Company of Channahon, Ill.

Referring to FIG. 2, in a second step about 5 to 12 percent-by-weight, relative to the weight of the admixture 20, of quarter-inch length chopped carbon fibers 24 are evenly applied to the resin-coated rotating mandrel.

Preferably, 5.5 to 7.5 percent-by-weight of carbon fibers is used. The fibers are manufactured by heating, oxidizing and carbonizing polyacrylonitrile (PAN) polymer fibers. First, the PAN fiber is heated in air. The heat causes the cyano sites within the PAN polymer chain to form repeated cyclic units of tetrahydropyridine. Continuing the heating process in air, oxidation occurs. The carbon atoms kick off their hydrogen atoms, and the rings become aromatic. The modified PAN polymer is now a series of fused pyridine-pyridone rings. The heating process, now called carbonization, is continued in the absence of air at a temperature above 1300° C. Adjacent polymer chains are joined together to produce a ribbon-like fused ring polymer. The ribbons condense together to form a lamellar, basal planar structure of nearly pure carbon. The polymer has nitrogen atoms along the edges of the basal planes which are expelled as nitrogen gas. The basal planes stack to form microcrystalline structures. The size and orientation of these crystallites determine the properties of the final carbon fiber product. Preferably, the quarter-inch chopped carbon fibers are PANEX™ 33-CF, manufactured by Zoltek Corporation of St. Louis. Mo, which have a diameter of 0.283 mil, a density of 0.065 lb/in$^3$, and an electrical resistivity of 0.00068 ohm-in. Preferably, the fibers 24 are sprayed on using a chop-gun 26 such as are manufactured by Venus-Gusmer, Inc. of Kent, Wash. Alternatively, the fibers may be applied by hand. When a chop-gun is used, fibers are embedded in the still wet resin layer 18 at various depths and orientations with an appreciable fraction reaching surface 18S, as well as deposited on surface 18E.

Use of carbonized fibers results in a solidified resin laminate that is as hard as those disclosed in the '299 and '994 references. In contrast, laminates produced utilizing two techniques for obtaining an electrically conductive lining in a FRP duct as disclosed by Dow Chemical Company in Technical Information Memoranda dated Dec. 1, 1992 and Jun. 1998 proved unsuitable as an innermost layer. Admixing finely powdered graphite flakes with the resin resulted in laminates that were too soft; and admixing segments of carbon veil with the resin resulted in laminates that were frangible and porous.

Referring to FIG. 3, in a third step a "deairing" roller 30 is used to break down any clumps of fibers and blend the admixture and fibers to a uniform color and texture so that more fibers contact surface 18S. Referring to FIG. 4, in a fourth step the applicator roller 16 is used to apply a second thin layer 32 with a surface 32S of the admixture 20. Layer 32 is about 2–3 mils in thickness and is dispensed from the dispensing device 22. A fifth step repeats the step shown in FIG. 2 wherein about 5 to 12 percent-by-weight, and preferably 5.5 to 7.5 percent-by weight, of the fibers 24 are evenly applied to layer 32. A sixth step repeats the step shown in FIG. 3 wherein the deairing roller 30 is used to break down any clumps of the newly applied fibers and further blend the admixture 20 and fibers to uniform color and texture.

Figure 5:
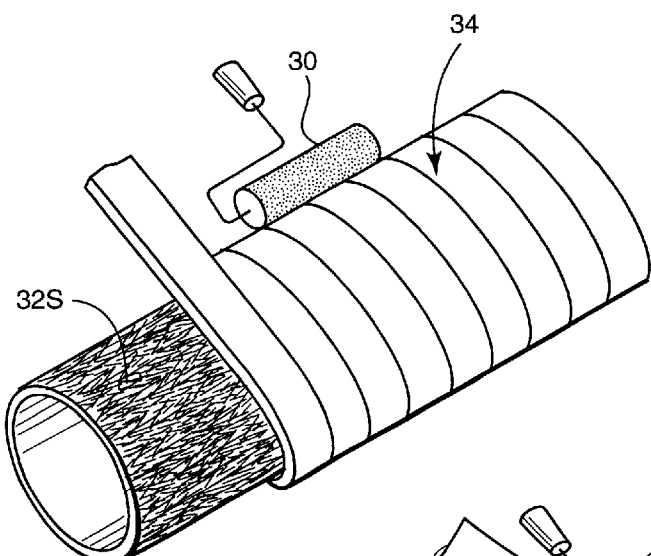
FIG. 5 schematically shows a seventh step in making the inner wall wherein a layer of polyester veil is wound over the FIG. 4 mandrel.
Figure 6:
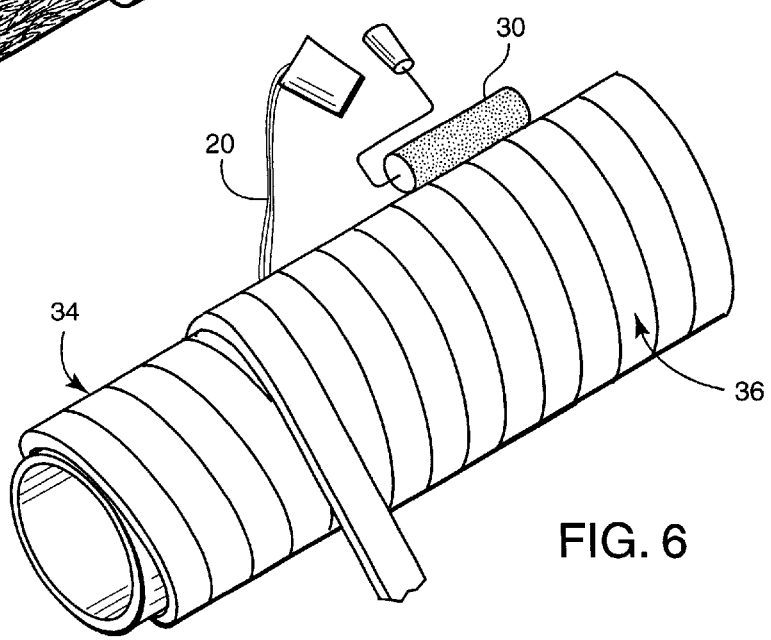
FIG. 6 schematically shows an eighth step in making the inner wall wherein a second layer of polyester veil pre-wetted with the FIG. 1 admixture is wound over the FIG. 5 mandrel, followed by trapped air being rolled out with the FIG. 3 roller.

Referring to FIG. 5, in a seventh step a first layer 34 of acid-free random spunbonded 100% polyester veil 4–8 mils in thickness is tightly wound helically at an angle of about 45 degrees off-center over surface 32S and then rolled out with roller 30. The tight winding compresses and helps orient the carbon fibers. Preferably, the veil is four inches in width for ducts less than 36 inches in diameter, and six inches in width for ducts greater than 36 inches in diameter. Preferably, the veil is REEMAY™ manufactured by Reemay, Inc. of Old Hickory, Tenn. Referring to FIG. 6, in an eighth step a second layer 36 of veil 4–8 mils in thickness, pre-wetted with the admixture 20, is helically wound over layer 34 and then rolled out using roller 30. The laminate is then allowed to exothermically cure for about 15–20 minutes. Referring to FIG. 7, in a ninth step the roller 16 is used to apply a third thin layer 38 with a surface 38S of the admixture 20. Layer 32 is about 2–3 mils in thickness and is dispensed from the dispensing device 22.

Referring to FIG. 8, in a tenth step a layer of 0.75 ounce per square yard (oz./yd$^2$) mat-type fiberglass 40 25–32 mils in thickness, pre-wetted with an admixture 42 of a phenolic resin and a curing agent, such as a mixture of 11 percent-by-weight paraformaldehyde and 4 to 9 percent-by-weight methanol, dispensed from a dispensing device 44, is helically wound over the surface 38S and then rolled out with roller 30. This completes assembly of the duct inner wall 10 shown in FIG. 9 which has a total thickness of about 50 mils and includes: an innermost layer 46 of vinyl ester resin and benzoyl peroxide admixture 4–6 mils thick incorporating carbonized carbon fibers; a layer 34 of 100% polyester veil 4–8 mils thick; a second layer 36 of the veil pre-wetted with the admixture; a layer 38 of the admixture 2–3 mils thick; and an outermost layer of 0.75 oz./yd$^2$ mat-type fiberglass 40 25–32 mils thick pre-wetted with an admixture of phenolic resin and a curing agent. The layers of the laminated outer wall are then applied as described in the '299 and '994 patents.

The carbon fibers which are embedded on or terminate at the surface 18S are electrically conductive so electrostatic charges accumulating on the surface are dissipated by being homogeneously dispersed over the total surface area and so cannot build up local concentrations that might lead to an electrostatic discharge. Moreover, since the fibers are embedded three-dimensionally within the resin rather than deposited in a surface layer, they act as neutralizing "sinks" to draw electric charge into the resin interior and away from surface 18S, thereby further reducing electric potential at the surface.

III. Resistivity Test Results
A. Test Method

Volume and surface resistivity tests according to ASTM D 4496–87 were performed on five specimens cut from a dual-wall duct approximately 6 inches in diameter and 3 feet, 10½ inches in length, fabricated according to the invention. The tests were performed by Delsen Testing Laboratories, Inc. of Glendale, Calif. The specimens, each approximately 6 inches by 0.5 inch, were cut out from the axial direction of the duct. The specimens were cleaned with isopropyl alcohol and distilled water and dried at room ambient conditions. A four-point measurement technique was used to determine the resistance of each specimen. Opposed ends of the inner wall of the specimen were painted with silver paint and served as current electrodes. Two conductive silver paint lines were applied across the width of the interior surface of the specimen (i.e., surface 18S) and served as potential electrodes. While DC current was applied through the the first pair of electrodes, the potential drop between the other pair of electrodes was measured. A nominal thickness of 50 mils for the inner wall was used to calculate volume and surface resistivity. Because the outer wall was found to be non-conductive, it was assumed that current did not flow through the outer wall and flowed only through the inner wall. All measurements were taken at 71° F. temperature and 49% relative humidity.

Resistance was calculated as follows:

$R=V/I$ where R=resistance (ohms); V=potential drop (volts); I=applied currrent (amperes).

Volume and surface resistivity were calculated as follows:

$$\rho v = ((t \times W)/L) \times R$$

$$\rho s = (W/L) \times R$$

where
ρv=volume resistivity (ohm-cm)
ρs=surface resistivity (ohms/square)
R=resistance (ohms)
t=specimen thickness (inches)
L=distance between potential electrodes (inches)
W=specimen width (inches)

B. Test Results

Table 1 shows the test results. In all cases the measured resistance and the derived surface resistivity are very low. Thus, surface 18S is an excellent electrical conductor. In all cases the volume resistivity is about an order of magnitude less than the surface resistivity, an effect probably accounted for by the relatively higher number density of carbon fibers internal to the resin compared to fibers at or on surface 18S.

TABLE 1

| Current Direction | W | t | L | R | $\rho_V$ | $\rho_D$ |
|---|---|---|---|---|---|---|
| Specimen 1 | | | | | | |
| Forward | 0.497 | 0.050 | 3.41 | 17.91 | 0.33 | 2.6 |
| Reverse | 0.497 | 0.050 | 3.41 | 17.93 | 0.33 | 2.6 |
| Specimen 2 | | | | | | |
| Forward | 0.496 | 0.050 | 3.41 | 13.94 | 0.26 | 2.0 |
| Reverse | 0.496 | 0.050 | 3.41 | 13.94 | 0.26 | 2.0 |
| Specimen 3 | | | | | | |
| Forward | 0.491 | 0.050 | 3.41 | 20.51 | 0.38 | 3.0 |
| Reverse | 0.491 | 0.050 | 3.41 | 20.50 | 0.38 | 3.0 |
| Specimen 4 | | | | | | |
| Forward | 0.497 | 0.050 | 3.41 | 19.59 | 0.36 | 2.9 |
| Reverse | 0.497 | 0.050 | 3.41 | 19.59 | 0.36 | 2.9 |
| Specimen 5 | | | | | | |
| Forward | 0.486 | 0.050 | 3.40 | 15.31 | 0.28 | 2.2 |
| Reverse | 0.486 | 0.050 | 3.40 | 15.31 | 0.28 | 2.2 |

What is claimed is:

1. A laminated duct structure for transporting corrosive vapors and gases comprising an innermost layer formed of a cured epoxy vinyl ester resin, the layer having a preselected thickness determined by an interior surface and an exterior surface and incorporating a multiplicity of electrically conductive fibers distributed three-dimensionally throughout the layer and two-dimensionally at the interior surface, the fibers in a preselected percentage-by-weight relative to the weight of the cured resin.

2. The duct structure of claim 1 wherein the fibers are carbon fibers manufactured by heating, oxidizing and carbonizing polyacrylonitrile polymer fibers.

3. The duct structure of claim 2 wherein said fiber percentage-by-weight is in a range from about 5 to 12 percent.

4. The duct structure of claim 2 wherein said layer thickness is between 0.004 and 0.006 inch.

5. A laminated inner wall of a dual wall duct structure for transporting corrosive vapors and gases comprising:

an innermost layer formed of an admixture of an epoxy vinyl ester resin and a curing agent therefor in a preselected percentage-by-weight, relative to the weight of the resin, said innermost layer having a preselected thickness determined by an interior surface and an exterior surface and incorporating a multiplicity of electrically conductive fibers of a preselected length distributed three-dimensionally throughout the innermost layer and two-dimensionally at the interior surface, the fibers in a preselected percentage-by-weight relative to the weight of said admixture;

a first layer of polyester veil having a preselected thickness wound over said innermost layer;

a second layer of polyester veil having a preselected thickness wound over the first layer of veil, said second layer of veil pre-wetted with an admixture of an epoxy vinyl ester resin and a curing agent therefor in a preselected percentage-by-weight relative to the weight of the resin;

a second layer of an admixture of an epoxy vinyl resin and a curing agent therefor in a preselected percentage-by-weight relative to the weight of the resin, said admixture applied over the second layer of polyester veil to a preselected thickness; and a layer of mat-type fiberglass, having a preselected weight and a preselected thickness, wound over the second layer of said admixture, said mat-type fiberglass pre-wetted with an admixture of a phenolic resin and a curing agent therefor in a preselected percentage-by-weight relative to the weight of the resin.

6. The inner wall of claim 5 wherein the fibers are chopped carbon fibers manufactured by heating, oxidizing and carbonizing polyacrylonitrile polymer fibers, and the fiber length is about 0.25 inch.

7. The inner wall of claim 6 wherein said fiber percentage-by-weight is in a range from about 5 to 12 percent.

8. The inner wall of claim 7 wherein said innermost layer thickness is between 0.004 and 0.006 inch, and said first curing agent is benzoyl peroxide.

9. The inner wall of claim 8 wherein:

the first and second veil layers are acid-free random spunbonded 100% polyester, each having a thickness between 0.004 and 0.008 inch;

the thickness of the second admixture layer is between 0.002 and 0.003 inch;

the fiberglass weight is 0.75 oz./yd$^2$; and the fiberglass thickness is between 0.025 and 0.032 inch.

* * * * *